W. S. SEARLES.
OPHTHALMIC MOUNTING.
APPLICATION FILED MAY 31, 1921.
1,437,557.
Patented Dec. 5, 1922.
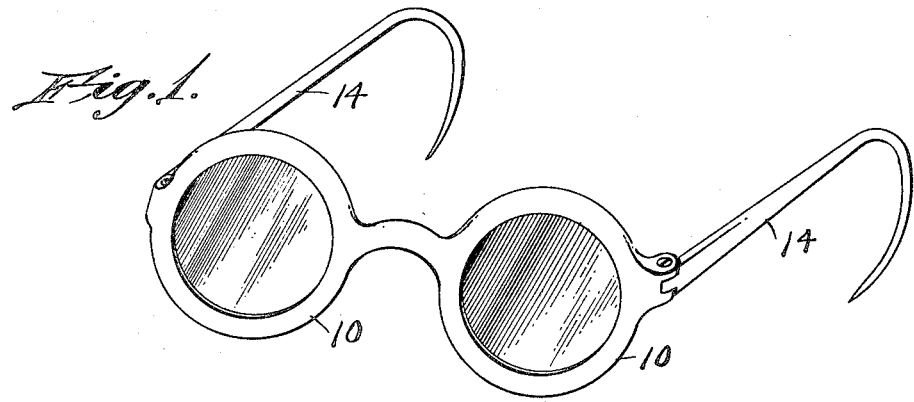
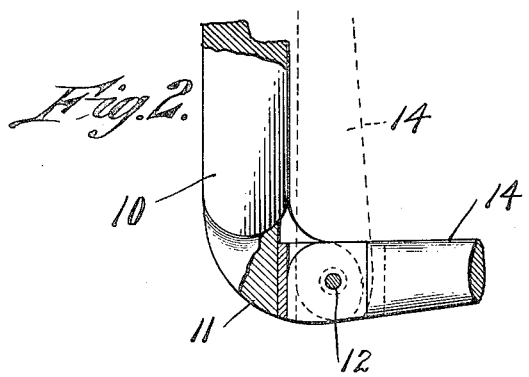
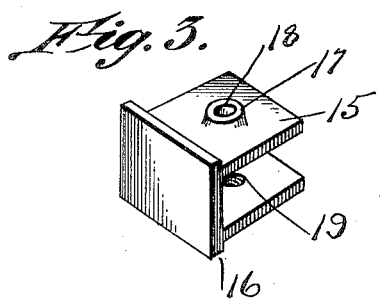
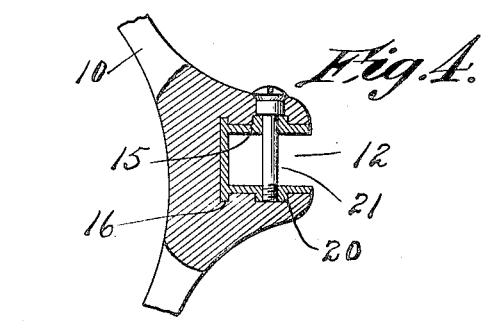
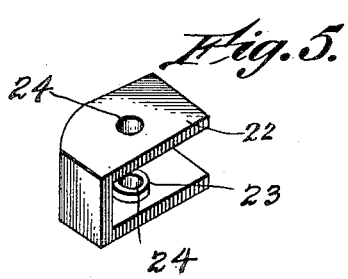
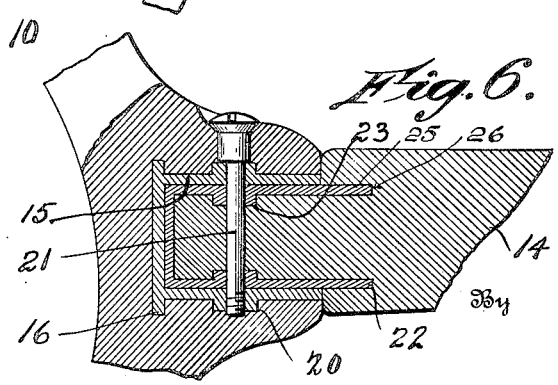
Inventor
Wayne S. Searles
By Howard E. Barlow
Attorney Patented Dec. 5, 1922.

1,437,557

UNITED STATES PATENT OFFICE.

WAYNE S. SEARLES, OF PROVIDENCE, RHODE ISLAND, ASSIGNOR TO UNIVERSAL OPTICAL CORPORATION, OF PROVIDENCE, RHODE ISLAND, A CORPORATION OF RHODE ISLAND.

OPHTHALMIC MOUNTING.

Application filed May 31, 1921. Serial No. 473,635.

*To all whom it may concern:*

Be it known that I, WAYNE S. SEARLES, a citizen of the United States, residing at Providence, in the county of Providence and State of Rhode Island, have invented certain new and useful Improvements in Ophthalmic Mountings, of which the following is a specification.

This invention relates to ophthalmic mountings and more particularly to the non-metallic or composition type of eyeglass frames; and the object of this invention is to provide an improved temple joint in such a frame.

A further object of the invention is to turn the lug portion of the joint on the frame rearwardly from the plane of the frame to reduce the space between the temples at the joints over that of the usual composition frame.

A still further object of the invention is to line the slot in the joint lug of the frame with metal to strengthen the same.

The invention further consists in the provision of a metal facing for the joint end of the temple to strengthen the same permitting these parts to be reduced in size and to render the temple joint of this class of eyeglass frames much less conspicuous.

With these and other objects in view, the invention consists of certain novel features of construction, as will be more fully described, and particularly pointed out in the appended claims.

In the accompanying drawings:—

Figure 1 is a perspective view illustrating my improved eyeglass frame.

Figure 2 is a greatly enlarged view illustrating the joint portion of the frame partly in section.

Figure 3 is a detail illustrating the metal lining member for the slot in the joint lug.

Figure 4 is a side elevation illustrating the metal lining member in position in the slot of the frame lug.

Figure 5 is a detail in perspective of the metal facing member for the joint end of the temple.

Figure 6 shows the metal faced joint end of the temple as pivotally mounted in the metal-lined slot of the frame lug.

With reference to the drawings, 10 designates my improved eyeglass frame which is made of shell, celluloid, or other composition material.

The usual construction of such frames is that a lug 11 at the joint end of the frame extends outwardly in a plane parallel with the frame and must, therefore, be of sufficient length to receive the usual door hinge type of connection to the temple, or in other cases the joint end of the temple must be offset in order to permit it to fold back over the inner face of the frame. To render this joint much less conspicuous and to also produce a better and stronger joint I have turned this lug rearwardly, as best illustrated in Figure 2, to extend to the rear beyond the plane of the inner face of the frame without offsetting its end.

In order to reduce the size of this joint lug to the minimum and strengthen the same against possibility of breaking I have provided a lining member 15 of metal for this slot and I have provided on the outer face of this lining member projections such as the flange 16 and the boss 17, which projections are adapted to be forced into the adjacent face of the softer material of the lug thereby serving to firmly retain this lining in position therein. This lining is also provided with a plain hole 18 in the enlargement 17 in the upper face and a tapped hole 19 in the enlargement 20 in its lower face and a pivot pin 21 is adapted to be passed downward through these holes and screw into the threaded hole in the enlargement 20.

In order to strengthen the hinge or pivot end of a temple I may make the pivot portion entirely of metal but I preferably provide a metal facing member or cap 22 which is provided with inwardly-extending enlargements or boss portions 23, each being provided with a hole 24 to permit the passage of the pivot pin 21. These inwardly-extending enlargements are also adapted to be imbedded into the surface of the softer material of the temple to permanently bind the metal to the composition material and the inner edges 25 of these facing plates are adapted to extend into corresponding slots 26 in the temple, if desired.

The metal joint or metal-faced joint portion of the temple may now be inserted into the metal lined slot in the lug and the two connected together by means of the pivot pin 21 and by setting up on this screw threaded pivot pin, the lower end of which is threaded into the metal enlargement 20 of the lining it will be seen that the parts of the joint may be nicely closed or sprung together to cause the proper amount of working friction on these parts and to take up any slack, lost motion, or wear on the joint.

By my improved construction of joint I have performed seven functions; first, I have turned the lug rearwardly to lessen its projection or extension beyond the edge of the frame rendering it much less conspicuous than the old form of joint lug; second, by this construction the pivoted end of the temple member may be made straight and not offset as is usually the case where the temple is pivoted in the lug; third, I have lined the slot of the lug with metal to stiffen and strengthen the same; fourth, I have provided by this lining a thickened metal threaded portion to receive the threaded end of the pivot pin or screw; fifth, I have provided projections on the surface of this metal lining to imbed themselves into the adjacent surface of the soft material of the lug and so lock the lining permanently therein; sixth, I have provided a metal end or facing for the joint end of the temple to strengthen this end and provide a metal-to-metal pivot joint to take the wear; seventh, I have also provided inwardly-extending portions on the inner surface of this lining member to imbed themselves into the softer material of the joint end of the temple to fix or secure the facing to the temple joint.

Another and important feature is that by turning these joint lugs inwardly the space between the temples at the joint is considerably reduced over that of the usual frame of this character.

My improved construction of joints of a composition eyelass frame, is simple and practical in construction and strong and durable in its operation.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. A non-metallic eyeglass frame having a slotted temple-receiving joint lug, a U-shaped metal lining housed in and locked to the inclosing side walls of said slot, and a temple pivoted in said lining.

2. A non-metallic eyelass frame having a slotted temple joint lug, a metal lining for the side faces of said slot having lateral projections imbedded into the inclosing walls of the softer material to lock the lining therein, and a nonmetallic temple having the sides of its joint end faced with metal and pivotally mounted in the lining of said lug.

3. A non-metallic eyeglass frame having a slotted temple joint lug, a metal lining for the side faces of said slot, said lining having lateral projections imbedded into the inclosing walls of the softer material of the lug, and a temple pivoted in said lining.

4. A non-metallic eyeglass frame having a slotted temple joint lug, a metal lining for the side faces of said slot having means engaging the inclosing walls for locking the lining therein, and a non-metallic temple having the side faces of its joint end faced with metal and pivotally mounted in the lining of said lug.

5. A non-metallic eyeglass frame, an integral slotted temple joint, a metal lining in the side walls of the slotted portion of said lug, and a non-metallic temple having the side faces of its joint end faced with metal and pivotally mounted in the lining of said lug.

In testimony whereof I affix my signature.

WAYNE S. SEARLES.